United States Patent
Yorke

(10) Patent No.: US 7,020,659 B2
(45) Date of Patent: Mar. 28, 2006

(54) SYSTEM AND METHOD FOR MANAGING BI-DIRECTIONAL RELATIONSHIPS BETWEEN OBJECTS

(75) Inventor: Gordon James Yorke, Ottawa (CA)

(73) Assignee: OIC Acquistion I Corporation, Redwood Shores, CA (US)

( * ) Notice: Subject to any disclaimer, the term of this patent is extended or adjusted under 35 U.S.C. 154(b) by 520 days.

(21) Appl. No.: 09/930,800

(22) Filed: Aug. 15, 2001

(65) Prior Publication Data

US 2003/0041069 A1   Feb. 27, 2003

(51) Int. Cl.
  *G06F 17/00* (2006.01)
(52) U.S. Cl. ....................... 707/102; 717/108
(58) Field of Classification Search ............ 707/103 R, 707/8, 1, 2, 102; 709/224, 316, 203, 305; 704/200; 717/5, 108
  See application file for complete search history.

(56) References Cited

U.S. PATENT DOCUMENTS

| | | | |
|---|---|---|---|
| 5,499,371 A * | 3/1996 | Henninger et al. | 717/108 |
| 5,615,362 A | 3/1997 | Jensen et al. | 395/614 |
| 5,706,506 A | 1/1998 | Jensen et al. | 395/614 |
| 5,717,917 A * | 2/1998 | Munakata | 707/8 |
| 5,732,270 A * | 3/1998 | Foody et al. | 709/316 |
| 5,903,725 A * | 5/1999 | Colyer | 709/203 |
| 5,956,509 A * | 9/1999 | Kevner | 709/203 |
| 6,078,926 A | 6/2000 | Jensen et al. | 707/103 |
| 6,101,502 A | 8/2000 | Heubner et al. | 707/103 |
| 2002/0152304 A1 * | 10/2002 | Collazo | 709/224 |
| 2003/0056195 A1 * | 3/2003 | Hunt | 717/116 |
| 2003/0110024 A1 * | 6/2003 | Broussard | 704/200 |

* cited by examiner

*Primary Examiner*—Mohammad Ali
*Assistant Examiner*—Etienne P LeRoux
(74) *Attorney, Agent, or Firm*—Park, Vaughan & Fleming, LLP

(57) ABSTRACT

A bi-directional relationship manager is described for setting a new reference value for managing bi-directional relationships between objects in an object model. The bi-directional relationship manager receives bi-directional relationship information indicating interrelation between objects having one or more bi-directional relationships. It creates proxy objects based on the bi-directional relationship information for selected bi-directional relationship objects having bi-directional relationships. A created proxy object receives a new reference value to be set in a selected object relating to a bi-directional relationship. It determines, using one or more of the proxy objects, a new peer value to be set in a peer object which has the bi-directional relationship with the selected object, and sets the new peer value to a proxy object created for the peer object. It may also update reference values of other related objects that are related to the selected object through one or more bi-directional relationships to reflect the change in references.

18 Claims, 10 Drawing Sheets

450 a1.setB(b0)

460

SYSTEM AND METHOD FOR MANAGING BI-DIRECTIONAL RELATIONSHIPS BETWEEN OBJECTS

This invention relates to a system and method for managing relationships between objects, and more particularly, to a system and method for managing bi-directional relationships between objects.

BACKGROUND OF THE INVENTION

Object model technology is becoming more popular for building enterprise applications. However, many organizations have already developed non-object oriented data storage systems and have their corporate data stored in those databases. Accordingly, it is desirable to provide a mechanism to allow object oriented applications to manipulate data in non-object oriented databases, such as relational databases (i.e., write, read, delete and update data in or from the databases as application objects). Object-oriented applications are built using object models with inheritance and relationships, whereas relational databases consist of flat tables and foreign keys. It is desirable to be able to represent the raw database data as application objects.

Databases are queried through a database query language, such as Structured Query Language (SQL), however it is desirable to query objects at the object level and through traversing the object model. To do so effectively, the relationships among objects need to be considered.

In an object model, some objects may reference other objects. When an object referenced by an other object has a reference back to the first object, these objects are related through a bi-directional relationship. When a user changes a reference in one object to another object, the relationship needs to be modified accordingly to maintain the bi-directional relationships among the related objects.

In existing systems, it is the user's responsibility to maintain these relationships. The user may need to develop code to modify references in objects one by one each time when a reference is changed. This is time and labor consuming and may involve errors. This prior solution results in added code maintenance by client developers. Also, this prior solution increases the chances of developer-created code error.

Accordingly, it is desirable to provide users with an automated means of maintaining bi-directional relationships among objects in an object model.

SUMMARY OF THE INVENTION

It is an object of the invention to provide a novel system and method for managing bi-directional relationships between objects that obviates or mitigates at least one of the disadvantages of existing systems.

The present invention uses proxy objects which have information regarding bi-directional relationships to determine a new value to be set in an object having a bi-directional relationship.

In accordance with an aspect of the present invention, there is provided a method for setting a new reference value for managing bi-directional relationships between objects in an object model. The method comprises the steps of receiving bi-directional relationship information indicating an interrelation between objects having one or more bi-directional relationships; creating proxy objects based on the bi-directional relationship information for selected bi-directional relationship objects having bi-directional relationships; receiving a new reference value to be set in a selected object relating to a bi-directional relationship; determining, using one or more of the proxy objects, a new peer value to be set in a peer object which has the bi-directional relationship with the selected object; and setting the new peer value to a proxy object created for the peer object.

In accordance with another aspect of the invention, there is provided a method for creating proxy objects for managing bi-directional relationships between objects in an object model. The method comprises the steps of receiving bi-directional relationship information indicating interrelation between objects having one or more bi-directional relationships; and creating proxy objects based on the bi-directional relationship information for selected bi-directional relationship objects having bi-directional relationships at peer relationships that comprise the bi-directional relationships, a created proxy object being capable of receiving a new reference value to be set in a selected object relating to a bi-directional relationship, determining, using one or more of the proxy objects, a new peer value to be set in a peer object which has the bi-directional relationship with the selected object, and setting the new peer value to a proxy object created for the peer object.

In accordance with another aspect of the invention, there is provided a bi-directional relationship manager for setting a new reference value for managing bi-directional relationships between objects in an object model. The bi-directional relationship manager comprises a bi-directional relationship information receiver for receiving bi-directional relationship information indicating interrelation between objects having one or more bi-directional relationships; and a proxy object creator for creating proxy objects based on the bi-directional relationship information, for selected bi-directional relationship objects having bi-directional relationships, at peer relationships that comprise the bi-directional relationships, a created proxy object receiving a new reference value to be set in a selected object relating to a bi-directional relationship, determining, using one or more of the proxy objects, a new peer value to be set in a peer object which has the bi-directional relationship with the selected object and setting the new peer value to a proxy object created for the peer object.

In accordance with another aspect of the invention, there is provided a proxy object for setting a new reference value for managing bi-directional relationships between objects in an object model. The proxy object comprises a new value receiver for receiving a new reference value to be set in a selected object relating to a bi-directional relationship; a new peer value determiner for determining a new peer value to be set in a peer object which has the bi-directional relationship with the selected object, the new peer value determiner using bi-directional relationship information indicating interrelation between objects having one or more bi-directional relationships; and a new peer value setter for setting the new peer value to a proxy object created for the peer object.

In accordance with another aspect of the invention, there is provided computer media storing the instructions or statements for use in the execution in a computer of a method for creating proxy objects for managing bi-directional relationships between objects in an object model. The method comprises the steps of receiving bi-directional relationship information indicating interrelation between objects having one or more bi-directional relationships; and creating proxy objects based on the bi-directional relationship information for selected bi-directional relationship objects having bi-directional relationships at peer relationships that comprise the bi-directional relationships, a created proxy object being capable of receiving a new reference value to be set in a selected object relating to a bi-directional relationship, determining, using one or more of the proxy objects, a new peer value to be set in a peer object which has the bi-directional relationship with the selected object, and setting the new peer value to a proxy object created for the peer object.

In accordance with another aspect of the invention, there is provided electronic signals for use in the execution in a computer of a method for creating proxy objects for managing bi-directional relationships between objects in an object model. The method comprises the steps of receiving bi-directional relationship information indicating interrelation between objects having one or more bi-directional relationships; and creating proxy objects based on the bi-directional relationship information for selected bi-directional relationship objects having bi-directional relationships at peer relationships that comprise the bi-directional relationships, a created proxy object being capable of receiving a new reference value to be set in a selected object relating to a bi-directional relationship, determining, using one or more of the proxy objects, a new peer value to be set in a peer object which has the bi-directional relationship with the selected object, and setting the new peer value to a proxy object created for the peer object.

In accordance with another aspect of the invention, there is provided a computer program product for use in the execution in a computer of a method for creating proxy objects for managing bi-directional relationships between objects in an object model. The product comprises a module for receiving bi-directional relationship information indicating interrelation between objects having one or more bi-directional relationships; and a module for creating proxy objects based on the bi-directional relationship information for selected bi-directional relationship objects having bi-directional relationships at peer relationships that comprise the bi-directional relationships, a created proxy object being capable of receiving a new reference value to be set in a selected object relating to a bi-directional relationship, determining, using one or more of the proxy objects, a new peer value to be set in a peer object which has the bi-directional relationship with the selected object, and setting the new peer value to a proxy object created for the peer object.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
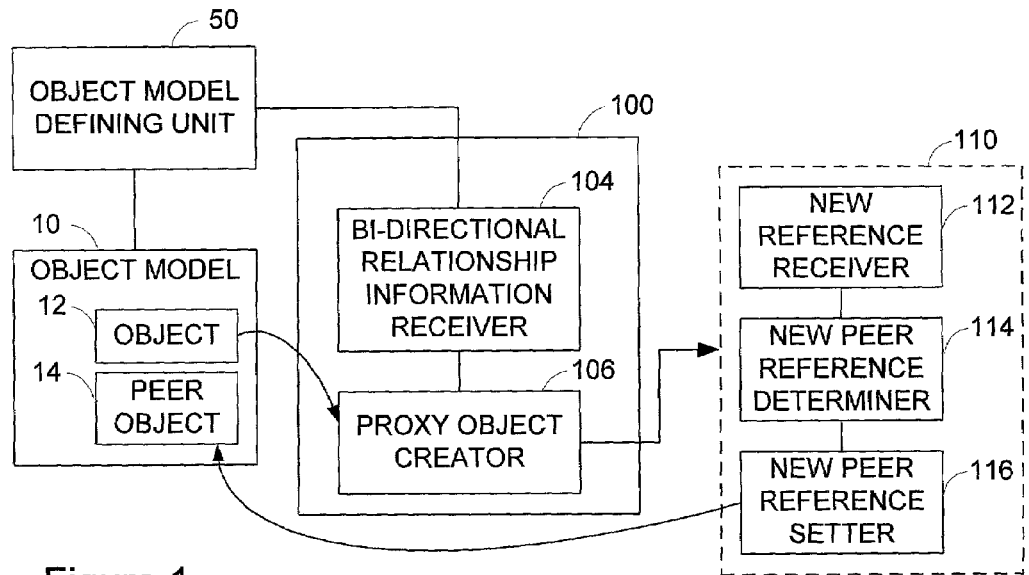
FIG. 1 is a diagram showing a bi-directional relationship manager in accordance with an embodiment of the invention.
Figure 2:
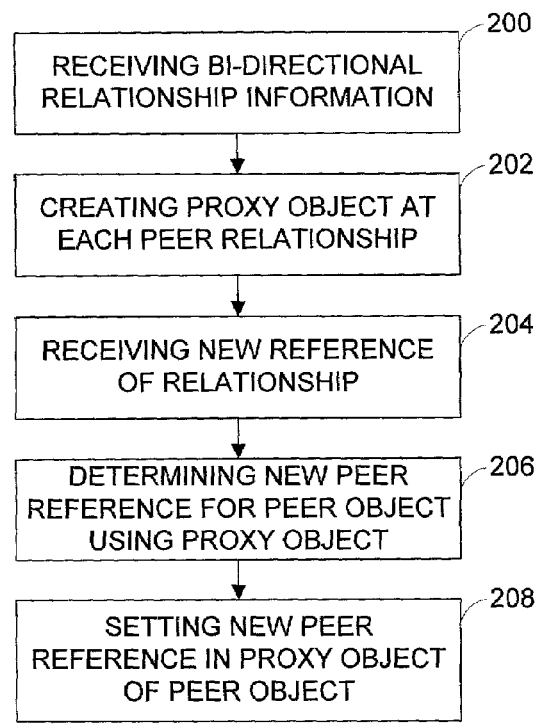
FIG. 2 is a flowchart showing the operation of the bi-directional relationship manager.

Referring to FIGS. 1 and 2, a bi-directional relationship (BDR) manager 100 in accordance with an embodiment of the present invention is described. The BDR manager 100 manages bi-directional relationships between objects in an object model 10. FIGS. 1 and 2 will be further described below, however, object relationships will now be described.

Figure 3:
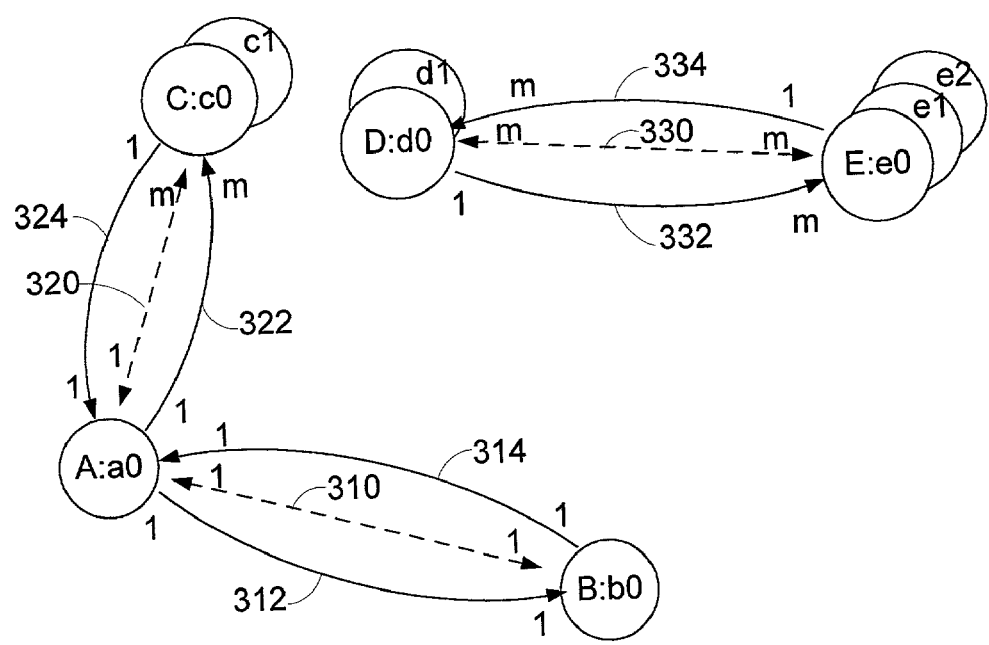
FIG. 3 is a diagram showing examples of different types of bi-directional relationships.

A bi-directional relationship is a relationship between a group of objects and another group of objects in which each group of objects has a reference to the other group of objects. A group of objects may contain one or more objects. A bi-directional relationship may be defined between object classes that contain objects. FIG. 3 shows examples of different types of bi-directional relationships.

In FIG. 3, object class A contains object a0, object class B contains object b0, object class C contains objects c0 and c1, object class D contains objects d0 and d1 and object class E contains objects e0, e1 and e2.

Object class A and object class B are related through a one-to-one bi-directional relationship. This means that an object in object class A has a reference to a single object in object class B, and an object in object class B has a reference to a single object in object class A. For example, object a0 has a one-to-one bi-directional relationship with object b0 as shown with arrow 310. The one-to-one bi-directional relationship 310 between objects may be considered as a pair of one-to-one unidirectional peer relationships, e.g., a peer relationship 312 from object a0 to object b0, and the other peer relationship 314 from object b0 to object a0.

Object class A and object class C are related through a one-to-many bi-directional relationship. This means that an object in object class A has a reference to one or more objects in object class C, and an object in object class C has a reference to a single object in object class A. For example, object a0 has a one-to-many bi-directional relationship with objects c0 and c1 as shown with arrow 320. The one-to-many bi-directional relationship 320 between objects may be considered as a pair of uni-directional peer relationships, e.g., a one-to-many uni-directional peer relationship 322 from object a0 to objects c0 and c1, and a one-to-one uni-directional peer relationship 324 from objects c0 and c1 to object a0.

Object class D and object class E are related through a many-to-many bi-directional relationship. This means that an object in object class D has a reference to one or more objects in object class E, and an object in object class E has a reference to one or more objects in object class D. For example, objects d0 and d1 have a many-to-many bi-directional relationship with objects e0, e1 and e2 as shown with arrow 330. The many-to-many bi-directional relationship 330 between objects may be considered as a pair of uni-directional peer relationships, e.g., a one-to-many uni-directional peer relationship 332 from objects d0 and d1 to objects e0, e1 and e2, and a one-to-many uni-directional peer relationship 334 from objects e0, e1 and e2 to objects d0 and d1.

An object class may have multiple bi-directional relationships with multiple object classes, as exemplified by object class A in FIG. 3. In that case, multiple bi-directional relationships may be the same type or different type of bi-directional relationships.

The objects having a bi-directional relationship may be called BDR objects. A BDR object is a peer object for the corresponding BDR object related to the BDR object through a bi-directional relationship. For example, objects a0 and b0 are peer objects for the one-to-one bi-directional relationship; and object a0 and objects c0 and c1 are peer objects for the one-to-many bi-directional relationship.

Bi-directional relationships are provided through references set in objects to identify their peer objects.

Referring back to FIG. 1, an object model defining unit 50 assists a developer of the object model 10 to define the structure and relationships of objects and/or object classes in the object model 10. Bi-directional relationships between objects are also defined through the object model defining unit 50.

The BDR manager 100 has a BDR information receiver 104 and a proxy object creator 106. The BDR information receiver 104 is provided for receiving from the object model defining unit 50 BDR information regarding bi-directional relationships in the object model 10. The proxy object creator 106 is provided for creating proxy objects based on the BDR information for handling the bi-directional relationships in the object model 10. A created proxy object 110 has a new reference receiver 112, a new peer reference determiner 114 and a new peer reference setter 116. The new reference receiver 112 receives a new reference to be set for an object. The new peer reference determiner 114 determines a new reference for a peer object, i.e., a new peer reference, in response to the new reference. The new peer reference setter 116 sets the new peer reference to a corresponding proxy object of the peer object. The new reference may be a value of a new reference to be added, a value of a new reference for changing a current reference to the new references, or a value of a current reference for removing it. The functions of these elements are further described referring to FIG. 2.

After the object model 10 is defined, the BDR manager 100 receives BDR information from the object model defining unit 50 through the BDR information receiver 104 (200). The BDR information includes information regarding those BDR objects having bi-directional relationships, the type of bi-directional relationships the BDR objects have, and which objects are peer objects for the BDR objects.

At the time of creating instances of objects according to the object model definition defined by the object model defining unit 50, based on the BDR information, the BDR manager 100 creates, using the proxy object creator 106, a proxy object for a BDR object at a peer relationship which is part of a bi-directional relationship (202). The BDR manager 100 may create proxy objects for some or all BDR objects at some or all of their peer relationships comprising bi-directional relationships.

Figure 4:
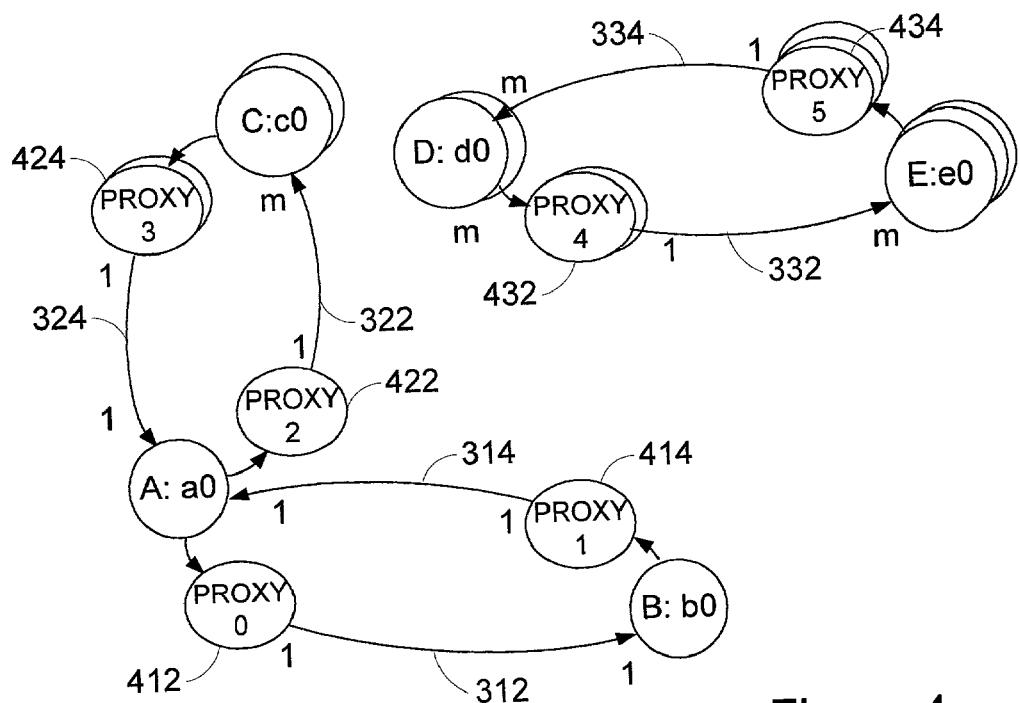
FIG. 4 is a diagram showing examples of proxy objects provided for different types of bi-directional relationships.

To explain proxy objects, FIG. 4 shows examples of proxy objects created by the BDR manager 100. Objects a0, b0, c0, d0 and e0 correspond to those shown in FIG. 3. In FIG. 4, multiple objects in the same object class are shown overlapped for the sake of simplicity of the illustration. Proxy object 412 is created for object a0 at the peer relationship 312 to its peer object b0, and proxy object 414 is created for object b0 at the peer relationship 314 to its peer object a0. Similarly, proxy object 422 is created for object a0 at the peer relationship 322 with its peer objects c0 and c1, and proxy object 424 is created for object c0 at the peer relationship 324 with its peer object a0. Proxy object 422 handles references to objects c0 and c1 as a collection of references. Another proxy object is also provided for a peer relationship from object c1 to object a0, but is not shown for simplicity of the illustration. Proxy object 432 is created for object d0 at the peer relationship 332 to a collection of its peer objects e0, e1 and e2, and proxy object 434 is created for object e0 at the peer relationship 334 with a collection of its peer objects d0 and d1. Similar proxy objects are also provided for objects d1, e1 and e2.

Referring back to FIG. 2, during the run time, when a user attempts to change a reference in a BDR object, the proxy object 110 of the BDR object receives the new reference through the new value receiver 112 (204). As the proxy objects are created based on the BDR information, each proxy object has knowledge regarding its host object to which it belongs, one or more peer objects with which the host object relates through a bi-directional relationship and the type of the bi-directional relationship. Based on this knowledge, the new peer reference determiner 114 determines a new peer reference to be set for the peer object(s) in response to the received new reference (206).

Figure 4A:
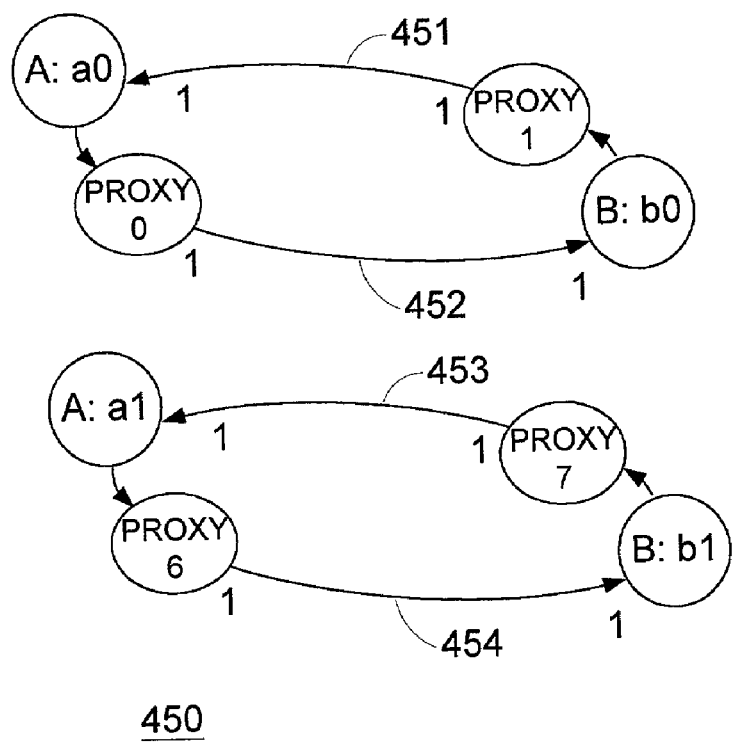
FIG. 4A is a diagram showing an example of maintenance of bi-directional relationships.
Figure 4A:
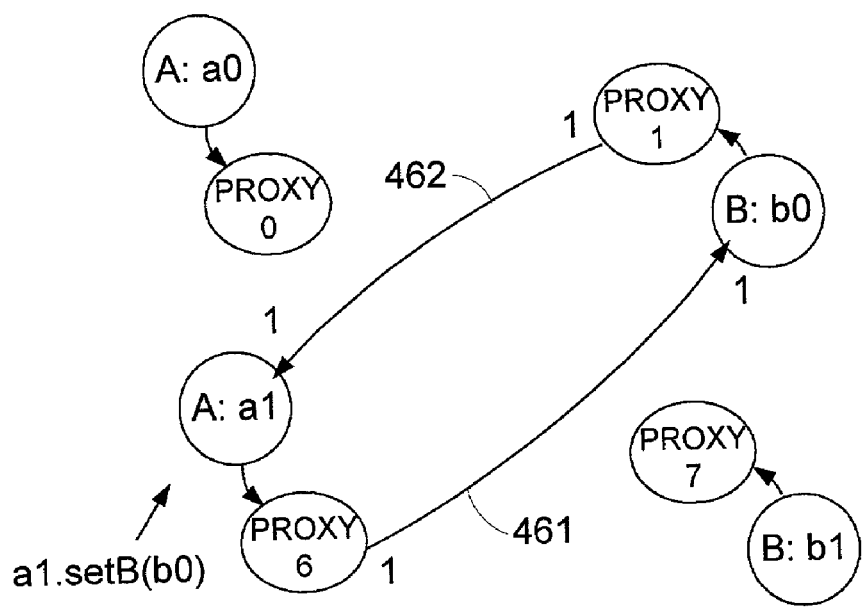

For example, in FIG. 4A, in the original state 450, objects a0 and b0 and objects a1 and b1 are respectively related through one-to-one bi-directional relationships as represented by peer relationships 451, 452, 453, 454. Proxy 0, proxy 1, proxy 6 and proxy 7 are provided for objects a0, b0, a1 and b1, respectively. When a user attempts to set a new reference b0 in object a1, this new reference is received by proxy object 6 provided for object a1. Since proxy object 6 knows that the relationships between objects a0 and b0 and objects a1 and b1 are one-to-one bi-directional relationships, it can determine what reference is to be set for its peer object b1. It sets the reference in object b1 as null to delete the one-to-one bi-directional relationship between objects a1 and b1 in order to allow a new one-to-one bi-directional relationship between objects a1 and b0.

The new peer reference setter 116 sets the new peer reference in the proxy object of the peer object (208). In the above example shown in FIG. 4A, the new peer reference "null" will be set in proxy object 7 to delete peer relationships. Also, the proxy objects of the related objects a0 and b0 are set with new references. This may be expressed as follows:

a1.proxy6.b1.proxy7.setValue(null);
a1.proxy6.setValue(b0);
a1.proxy6.b0.proxy1.a0.proxy0.setValue(null);
a1.proxy6.b0.proxy1.setValue(a1);

The first process removes the peer relationships 453 and 454 between objects a1 and b1. The second process adds a new peer relationship 461 from object a1 to object b0. The third process removes the peer relationships 451 and 452 between objects a0 and b0. The last process adds a new peer relationship 462 from object b0 to object a1.

Thus, when a reference is changed in an object having a bi-directional relationship, the BDR manager 100 automatically maintains the bi-directional relationships among the related objects. Accordingly, it is no longer up to the developer of the object model to ensure that all references are maintained. It reduces the amount of work required by the developer who would otherwise have to code the management within his or her application leaving the application open to errors and requiring higher levels of maintenance when changes occur in the design.

In the above embodiment, the BDR manager 100 receives the BDR information from the object model defining unit 50. However, it may receive the BDR information from a storage of the object model definition. Alternatively, the BDR manager 100 may have a similar object model defining unit or a storage internally and receive the BDR information from them.

Figure 5:
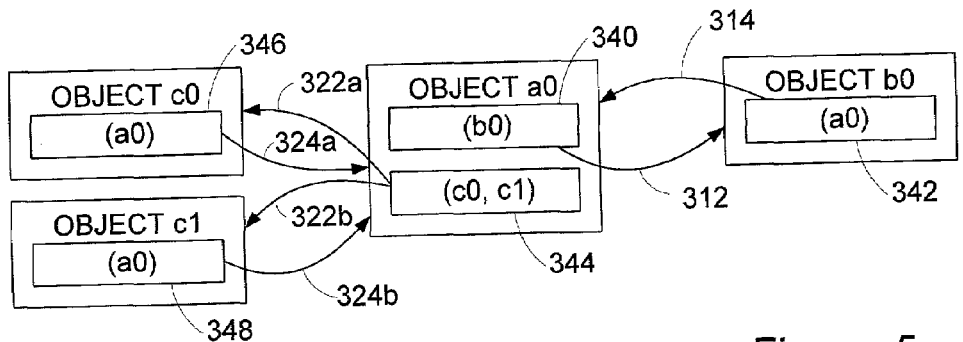
FIG. 5 is a diagram showing examples of objects having reference attributes for indicating bi-directional relationships.

BDR objects having bi-directional relationships may contain attributes to hold reference values that represent references to their peer objects. FIG. 5 shows examples of attributes in objects a0, b0, c0 and c1 shown in FIG. 3. Object a0 has attributes 340 and 344. Attribute 340 holds a reference value b0 to indicate the uni-directional peer relationship 312 to object b0. Object b0 has an attribute 342 which contains a reference value 0a to indicate the uni-directional peer relationship 314 to object a0. The attribute 344 of object a0 contains a collection of reference values c0 and c1 to indicate the uni-directional peer relationship 322 to objects c0 and c1. Objects c0 and c1 have attributes 346, 348 respectively which hold a reference value a0 to indicate the uni-directional peer relationship 324 to object a0. In this example, the reference values are the same as the object names, but may be any identification of the objects. An identification may not directly identify the object instance, but rather identify the type of object.

Figure 6:
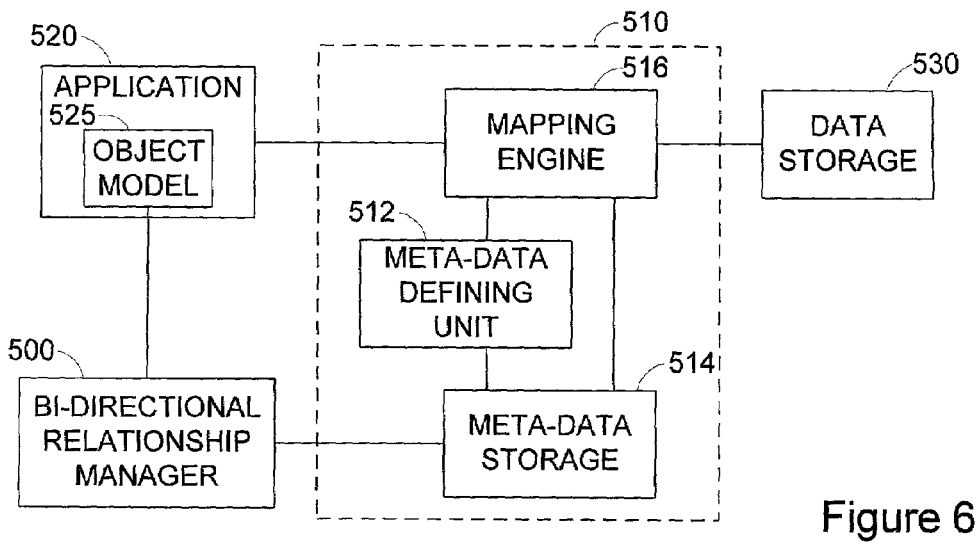
FIG. 6 is a diagram showing a bi-directional relationship manager in accordance with another embodiment of the invention.

Using the example shown in FIG. 5, a BDR manager 500 in accordance with another embodiment of the present invention is now described referring to FIG. 6. The BDR manager 500 uses object model meta-data received from a meta-data and mapping system 510.

The meta-data and mapping system 510 is provided between an object application 520 and a data storage 520. It allows the application 520 to manipulate data in the data storage 520 at the object level, i.e., read, write, delete and update data in or from the data storage 520 as application objects in an object model 522. The application 520 may use an object oriented language, such as the Java (TM Sun Microsystems) programming language. However, the invention is not limited to the use of the Java language. The data storage 520 may be any data storage in which data is stored in a specific architecture such that the data can be queried. For example, it may be a database, such as a relational database, or a file system, such as an extensible Markup Language (XML) file system. It may be a collection of multiple data storage systems.

The meta-data and mapping system 510 has a meta-data defining unit 512, a meta-data storage 514 and a mapping engine 516. The meta-data defining unit 512 is a development-time tool that assists developers of the object model 522 or data storage 520 in defining object model meta-data representing how the object model 522 maps to the data architecture of the data storage 520, or vise versa. For example, when the data storage 520 is a database that contains tables having attributes and/or foreign keys for referring to data in other tables, the meta-data defining unit 512 assists developers to map the tables, attributes and foreign keys in the database to object classes, objects and relationships in the object model 522. Thus, the meta-data contains the information that represents relationships and the structures of interrelated objects. For example, it contains the information regarding what attributes are used, in an object, to reference another object. The meta-data defining unit 512 may be a mapping tool for mapping between the object model 522 and the architecture of the data storage 520, an Application Programming Interface (API) or a tool for manually editing the meta-data.

For example, the meta-data relating to the one-to-many bi-directional relationship between classes A and B may be defined as follows:

For class A:
   OneToManyMapping bMapping=new OneToManyMapping( );
   bMapping.setAttributeName("b");
   bMapping.setReferenceClass(B.class);
   //Set the mapping to use the proxy
   bMapping.useTransparentCollection( );
   bMapping.addTargetForeignKeyFieldName
     ("B_TABLE.A_ID", "A_TABLE.ID");
   //set bi-directional information
   bMapping.addRelationshipPartnerAttributeName("a");
   descriptor.addMapping(bMapping);

For class B:
   OneToOneMapping aMapping=new OneToOneMapping( );
   aMapping.setAttributeName("a");
   aMapping.setReferenceClass(A.class);
   //Set the mapping to use the proxy
   aMapping.useBasicindirection( );
   aMapping.addForeignKeyFieldName
     ("B_TABLE.A_ID", "A_TABLE.ID");
   //set bi-directional information
   aMapping.addRelationshipPartnerAttributeName("b");
   descriptor.addMapping(aMapping);

The setting regarding the use of the proxy is further described below.

The meta-data storage 514 stores the meta-data defined by the meta-data defining unit 512. It may store the meta-data as XML files, in proprietary textual based representation, or in a runtime object structure. The object model meta-data storage 104 as provided is external to the object classes.

The mapping engine 516 is a run-time component that uses the meta-data and executes pre-defined mapping methods to map objects in the object model 522 into or from data in the data storage 520. The mapping methods are defined such that they are executable on the data storage 520 in terms of the object model 522, rather than the data storage architecture. This allows users to use the mapping system 500 without knowledge of data storage access APIs or data storage querying languages, such as Structured Query Language (SQL).

The BDR manager 500 receives the object model meta-data from the meta-data and mapping system 510, and manages bi-directional relationships between objects in the object model 522. It provides automatic bi-directional relationship maintenance functions using proxy objects, as further described below.

The BDR manager 500 receives the object model meta-data from the meta-data and mapping system 510 in this embodiment. However, the BDR manager 500 may receive it from an other meta-data system which is capable of defining the object model meta-data. Alternatively, the BDR manager 500 may include the meta-data defining unit 512 that allows users to define object-model meta-data. It may also include a meta-data storage for storing the meta-data.

Figure 7:
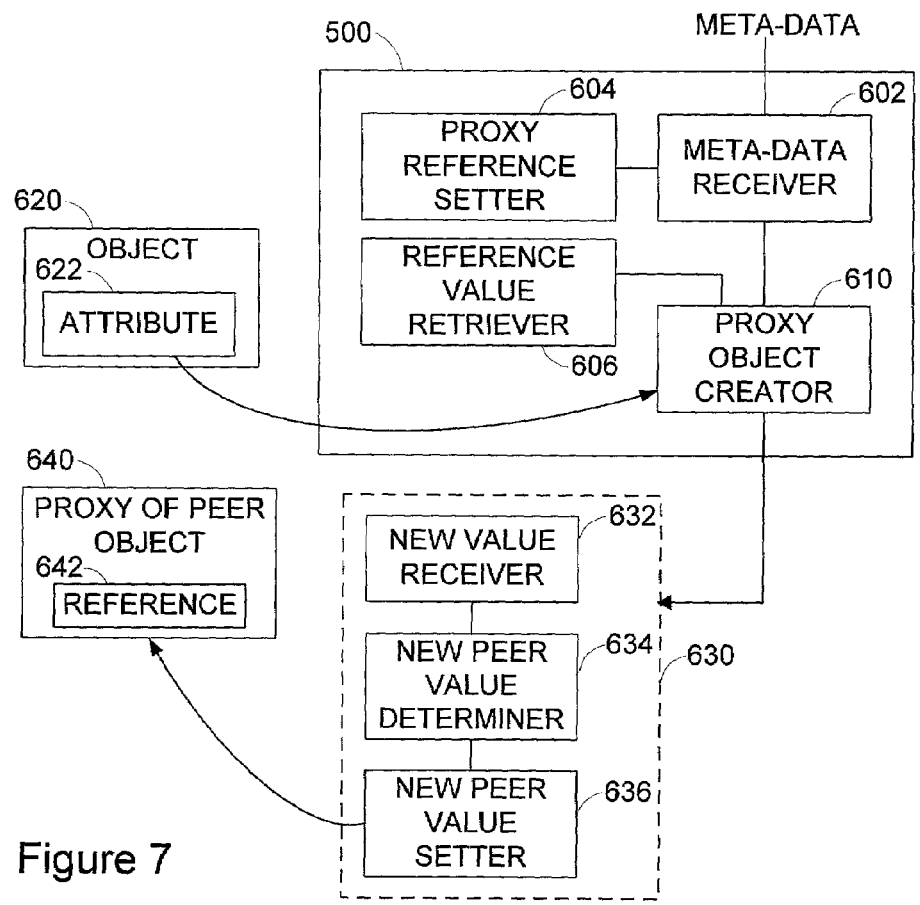
FIG. 7 is an example of the diagram showing a bi-directional relationship manager shown in FIG. 6.
Figure 8:
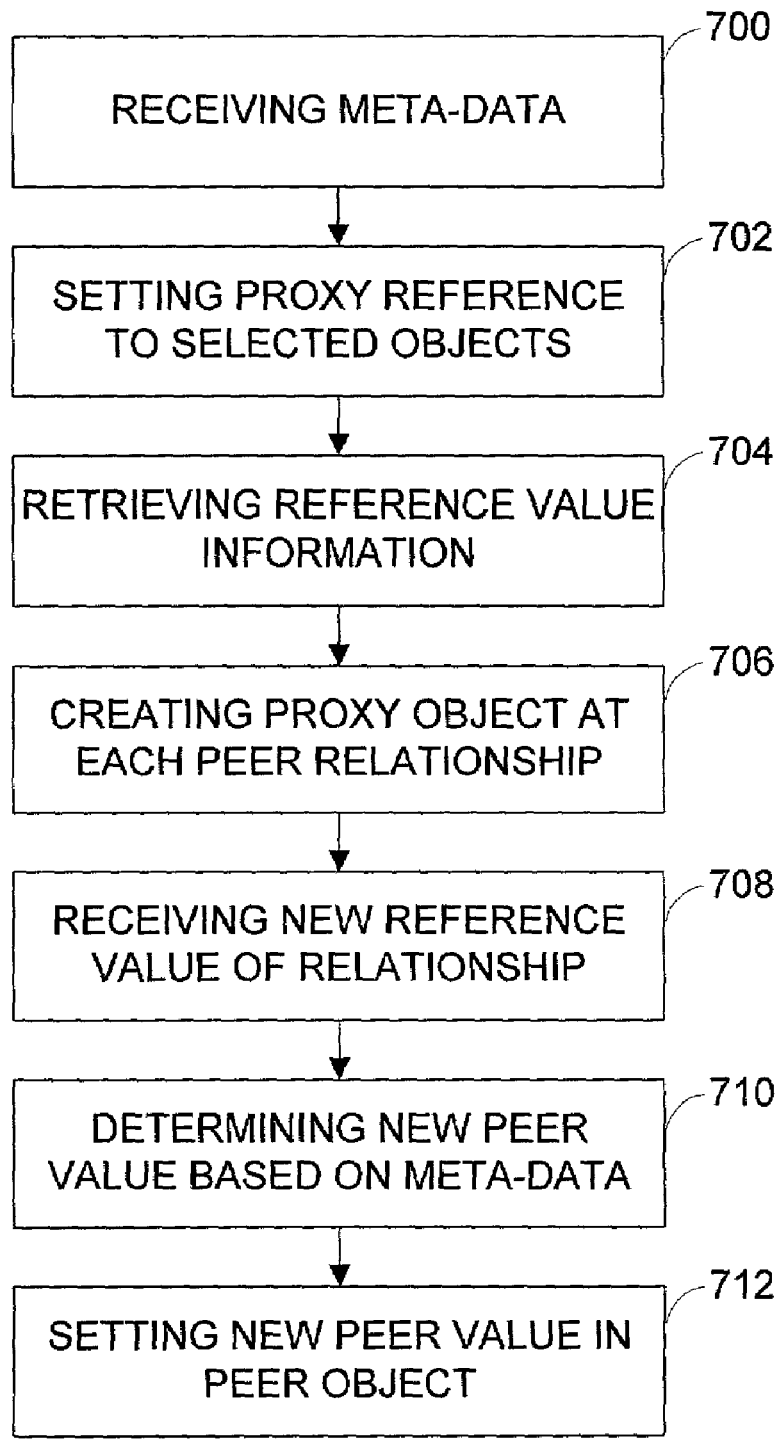
FIG. 8 is a flowchart showing the operation of the bi-directional relationship manager.

FIG. 7 shows an embodiment of the BDR manager 500. The manager 500 has a meta-data receiver 602, a proxy reference setter 604, a reference value retriever 606 and a proxy object creator 610. The functions of these elements are further described referring to FIG. 8.

The meta-data receiver 602 receives the object model meta-data stored in the meta-data storage 514 (700). The object model meta-data includes BDR information indicating those object classes that have bi-directional relationships with certain object classes, the type of the bi-directional relationships, and what attributes are used in an object to reference another object. However, the object model meta-data typically does not include actual reference values indicating current peer objects for BDR objects.

The proxy reference setter 604 allows the developer to select some or all of BDR objects for which the developer desires to use the automatic bi-directional relationship maintenance functions of the BDR manager 500. Through the proxy reference setter 604, the developer sets a proxy reference to the selected BDR objects (702). The setting of proxy references is typically completed before the user start changing reference values.

For example, for object classes A and B having a one-to-one bi-directional relationship:

```
public class A{
    public String name;
    public B b0Object;
}
public class B{
    public String name;
    public A a0Object;
}
``` the proxy references are set such as:

```
public class A{
    public String name;
    public Object b0Object;
}
public class B{
    public String name;
    public Object a0Object;
}
```

Figure 9:
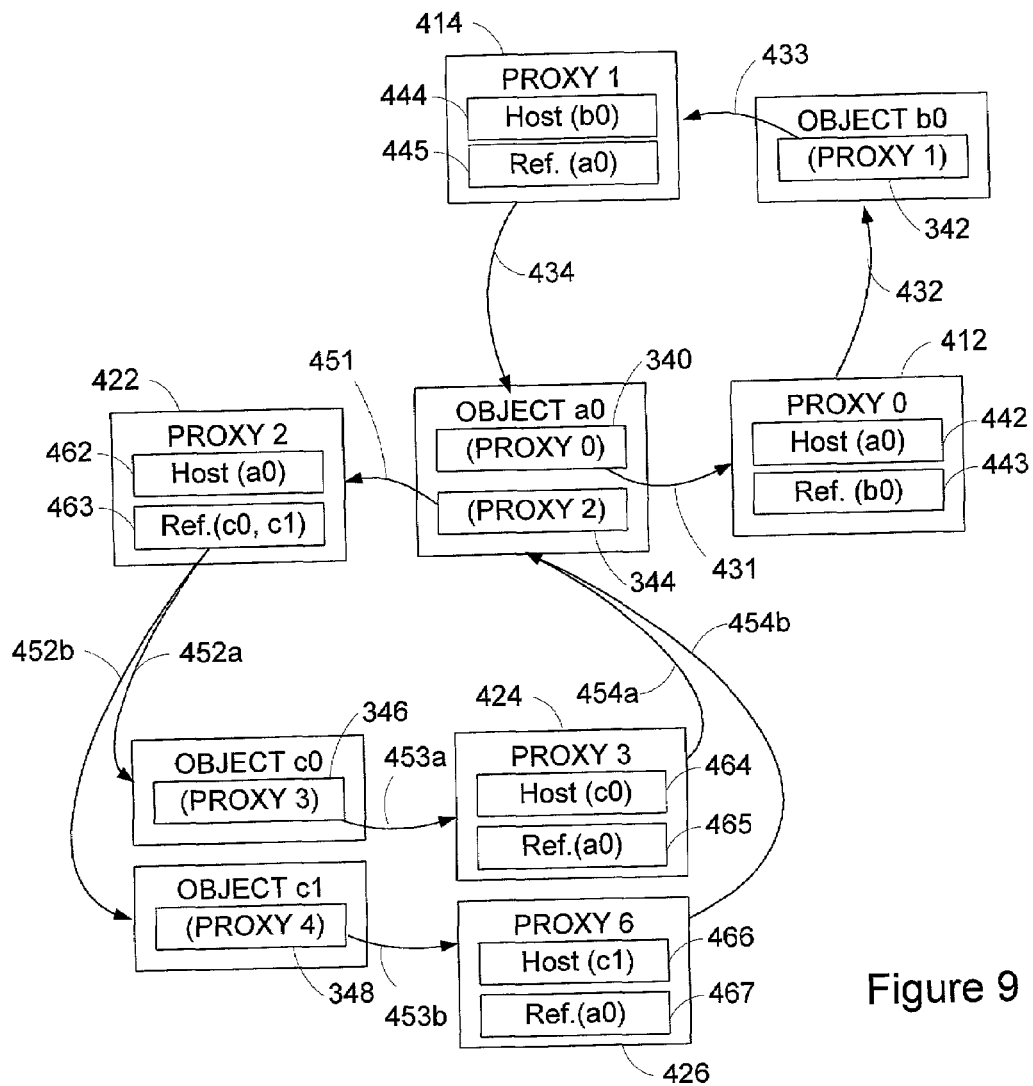
FIG. 9 is a diagram showing examples of proxy objects provided for different types of bi-directional relationships using reference attributes.

As shown in FIG. 9, the proxy references may be set by replacing the reference values of the attributes 340, 342, 344, 346 and 348 of the selected BDR objects a0, b0, c0 and c1 to reference corresponding proxy objects 0–3, respectively.

At runtime, when the user attempts to manipulate data stored in the data storage 530, the mapping engine 516 creates instances of objects corresponding to the data, using the object model meta-data or uses the object value provided by the application 520. The object value may be passed in from the application 520 for newly created objects in cases where the client wishes to create data on the data storage 530 to represent those objects.

The object meta-data received from the meta-data storage 514 includes bi-directional information that indicates the interrelation between object classes, but it may not have reference information representing actual reference values that indicate the corresponding peer objects for BDR objects. In that case, the BDR manager 500 retrieves reference value information from the data storage 530 or from newly created objects in the object model 525, using the reference value retriever 606 (704). The reference value retriever 606 may be a part of the mapping engine 516. The reference value information in individual selected BDR objects 620 is typically represented by values stored in one or more attributes 622 which are used to indicate the bi-directional relationships. This step may be omitted if the meta-data already has this reference value information.

Using the meta-data and reference value information, the BDR manager 500 creates a proxy object for the selected BDR objects at each of the peer relationships that comprise the bi-directional relationships for the selected BDR objects (706). For the example of objects shown in FIG. 5, proxy objects 412, 414, 422 and 424 are created for objects a0, b0 and c0 and c1 at each peer relationship, as shown in FIG. 9. For the one-to-many peer relationships, multiple objects are treated as a collection, and a single proxy object 422 or 424 is created in this example. However, a single proxy object may be provided for each object or for a different group of objects.

Based on the object model meta-data and reference value information, each proxy object has knowledge of its host object to which the proxy object is provided, its peer object with which the host object has a bi-directional relationship and the type of the bi-directional relationship. For example, proxy object 412 has a host object attribute 442 indicating its host object a0, and a reference attribute 443 indicating its referencing object b0. Similarly, proxy object 414 has a host object attribute 444 indicating its host object b0, and a reference attribute 445 indicating its referencing object a0. Proxy object 422 has a host object attribute 462 indicating its host object a0, and a reference attribute 463 indicating its referencing objects c0 and c1. Proxy object 412 has a host object attribute 464 indicating its host objects c0 and c1, and a reference attribute 465 indicating its referencing object a0.

Referring back to FIGS. 7 and 8, when a user attempts to set a new reference value for one of the selected BDR objects, the corresponding proxy object 630 of the BDR object receives the new reference value (708). The proxy object 630 then determines a new reference value, i.e., new peer value, to be set for a peer object of the BDR object using the meta-data and reference value information (710). This may be carried out by bringing the information regarding the new reference value through proxy objects related to the bi-directional relationship, as further described below. Then, the proxy object 630 sets the new peer value in a relevant proxy object of the peer object (712).

Accordingly, the BDR manager 500 may automatically maintain bi-directional relationships when a reference value is changed in a selected BDR object.

The determination of new peer values is further described referring to FIGS. 10 to 13 using some examples.

Figure 10:
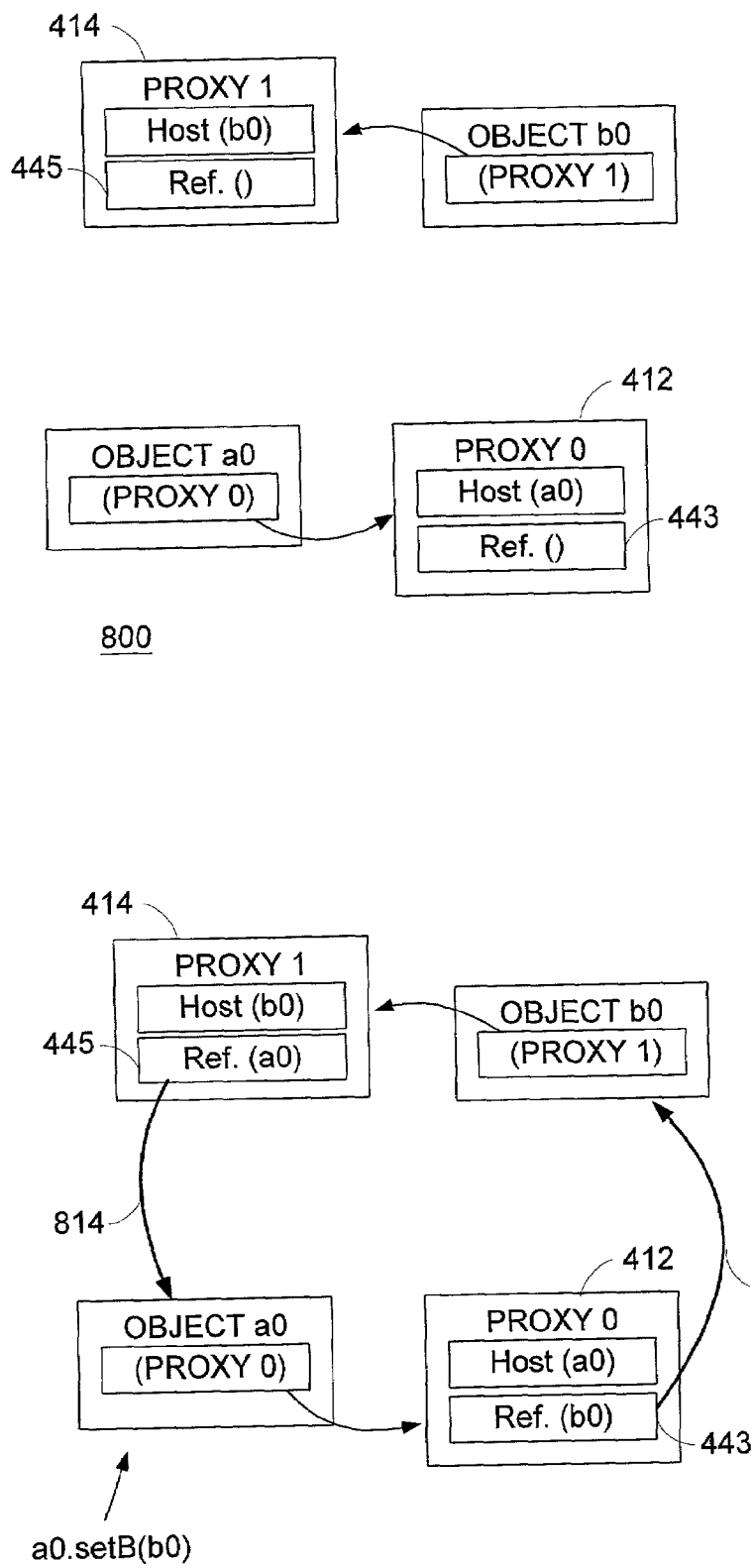
FIG. 10 is a diagram showing an example of maintenance of bi-directional relationships.

FIG. 10 illustrates the reference value setting for a one-to-one bi-directional relationship between object a0 and object b0. In the original state 800, there is no bi-directional relationship set between objects a0 and b0. The reference attributes 443 and 445 of the proxy objects 412 and 414 for objects a0 and b0 are empty. As shown in the setting state 810, the user attempts to set a new reference value b0 for object a0, i.e., invokes a setter call:

a0.setB(b0)

The proxy object 412 of the object a0 receives the new reference value b0 and sets it in its reference attribute 443. As the proxy object 412 has knowledge that objects a0 and b0 have a one-to-one bi-directional relationship, it determines that a new peer value a0 and sets it in the reference attribute 445 of the proxy object 414 for the peer object b0. This determination and setting of the new values may be carried out automatically by the following process:

a0.proxy0.setValue(b0);
a0.proxy0.b0.proxy1.setValue(a0);

Thus, the one-to-one bi-directional relationship is updated through a pair of uni-directional peer relationships 812 and 814.

Figure 11:
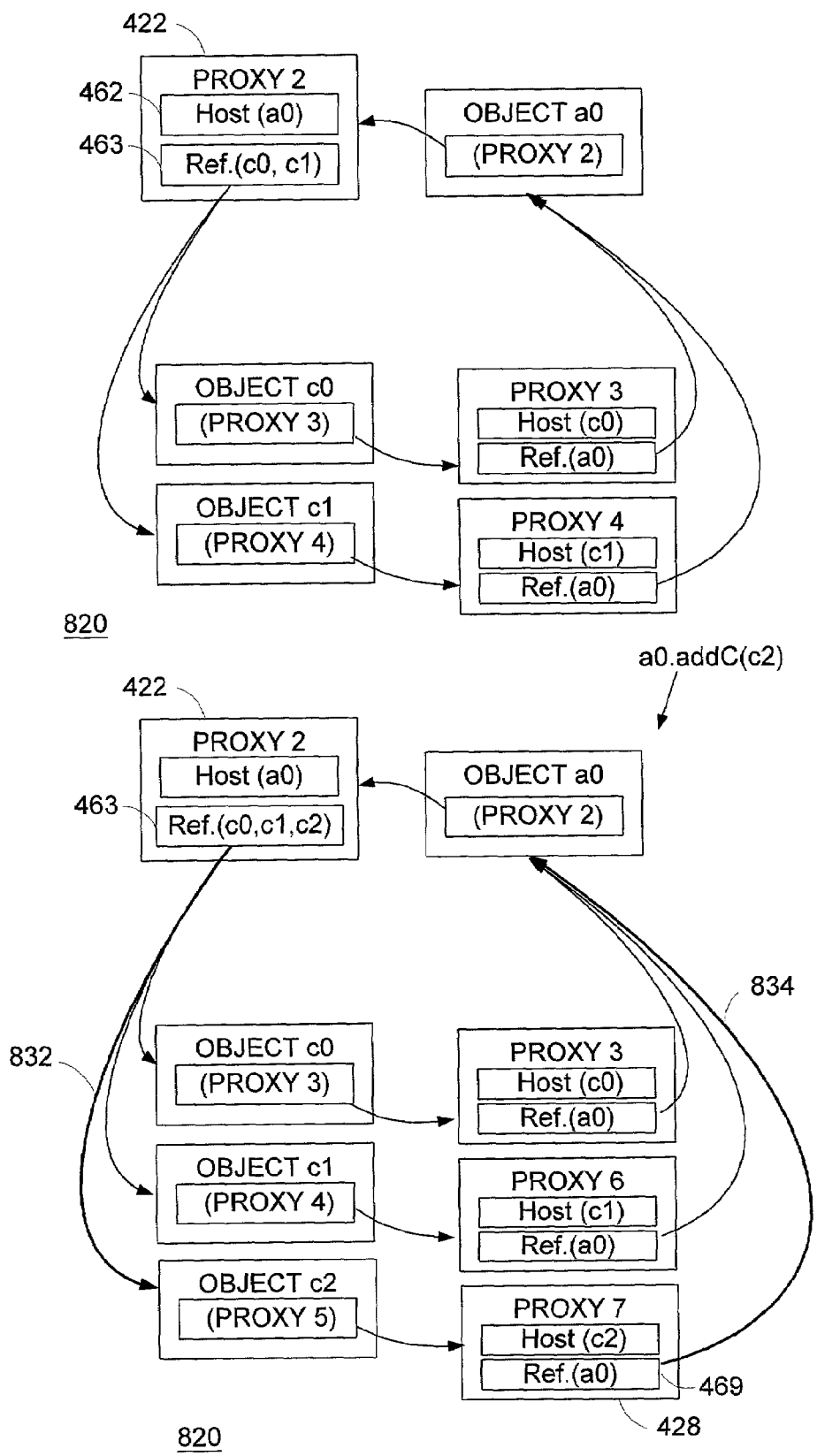
FIG. 11 is a diagram showing an example of maintenance of bi-directional relationships.

FIG. 11 illustrates the reference value setting for adding a new reference value to a one-to-many bi-directional relationship. In the original state 820, object a0 is related with objects c0 and c1 through a one-to-many bi-directional relationship. The reference attribute 463 of proxy object 422 for object a0 contains a collection of reference values c0 and c1. As shown in the setting state 830, the user attempts to add a new reference value c2 for object a0, i.e., invokes an adder call:

a0.addC(c2)

The proxy object 422 of the object a0 receives the new reference value c2 and adds it in its reference attribute 463. As the proxy object 422 has knowledge that object a0 and object c2 have a one-to-many bi-directional relationship, it determines that a new peer value a0 and sets it in the reference attribute 469 of the proxy object 428 of the object c2. This determination and setting of the new values may be carried out automatically by the following process:

a0.proxy2.addValue(c2);
a0.proxy2.c2.proxy7.setValue(a0);

Thus, the one-to-many bi-directional relationship is updated through a pair of uni-directional peer relationships 832 and 834.

Figure 12:
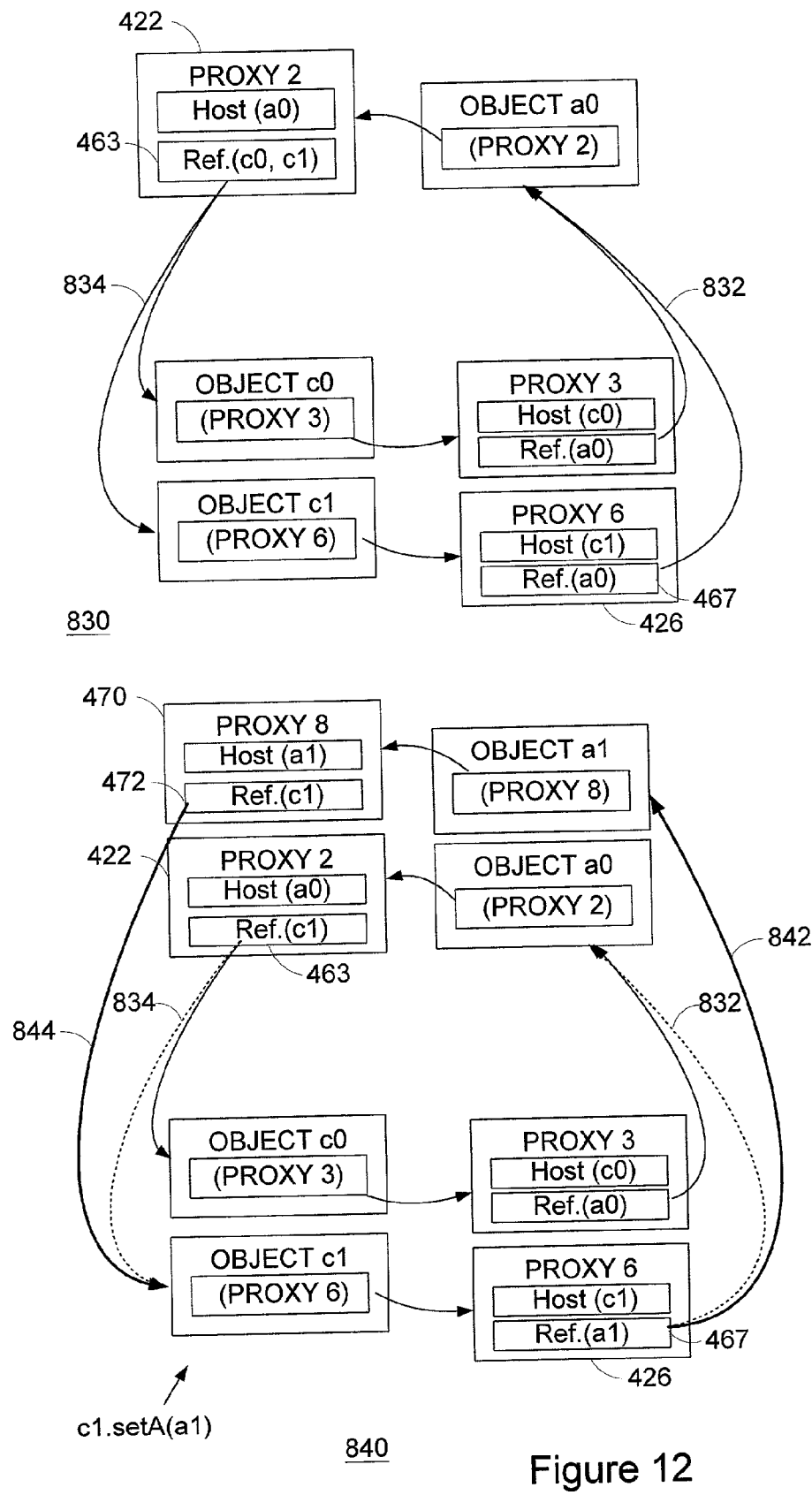
FIG. 12 is a diagram showing an example of maintenance of bi-directional relationships.

FIG. 12 illustrates the reference value setting for setting a new reference value to a one-to-many bi-directional relationship. In the original state 840, object a0 is related with objects c0 and c1 through a one-to-many bi-directional relationship. The reference attribute 463 of proxy object 422 for object a0 contains a collection of reference values c0 and c1. The reference attribute 467 of proxy object 426 for object c1 contains a reference value a0. As shown in the setting state 850, the user attempts to set a new reference value a1 for object c1, i.e., invokes a setter call:

c1.setA(a1)

The proxy object 426 of the object c1 receives the new reference value a1, which changes the reference value 467 of proxy object 426 from a0 to a1, which results in removal of a peer relationship 832 from proxy object 426 to object a0. As the proxy object 426 has knowledge that objects a0 and a1 and objects c0 and c1 have a one-to-many bi-directional relationship, the proxy object 426 determines a new peer value to be c1, i.e., removing c0, from the collection of reference values 463 in the proxy object 422 of object a0. This results in removing the peer relationship 834 from proxy object 422 to object c1. The proxy object 426 also determines another new peer value 463 to be c1 and sets this value in the reference attribute 472 proxy object 470 for object a1 This results in adding a peer relationship 844 from proxy object 430 to object c1. The determination and setting of the new values may be carried out automatically by the following process:

c1.proxy6.a0.proxy2.removeValue(c1);
c1.proxy6.removeValue(a0);
c1.proxy6.setValue(a1);
c1.proxy6.a1.proxy8.setValue(c1);

Thus, the one-to-many bi-directional relationship is updated through a pair of uni-directional peer relationships 842 and 844.

Figure 13:
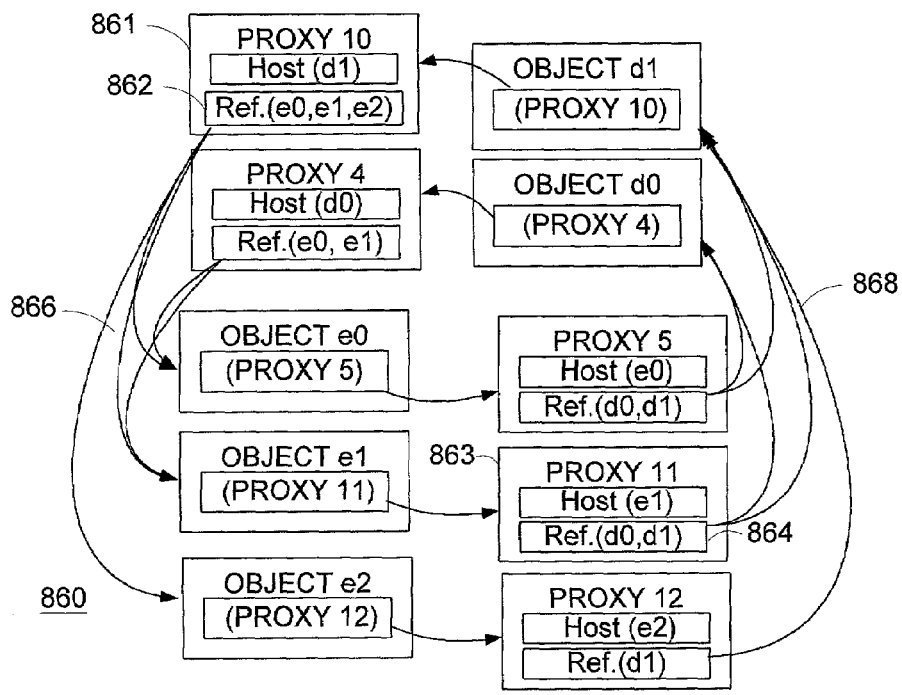
FIG. 13 is a diagram showing an example of maintenance of bi-directional relationships.
Figure 13:
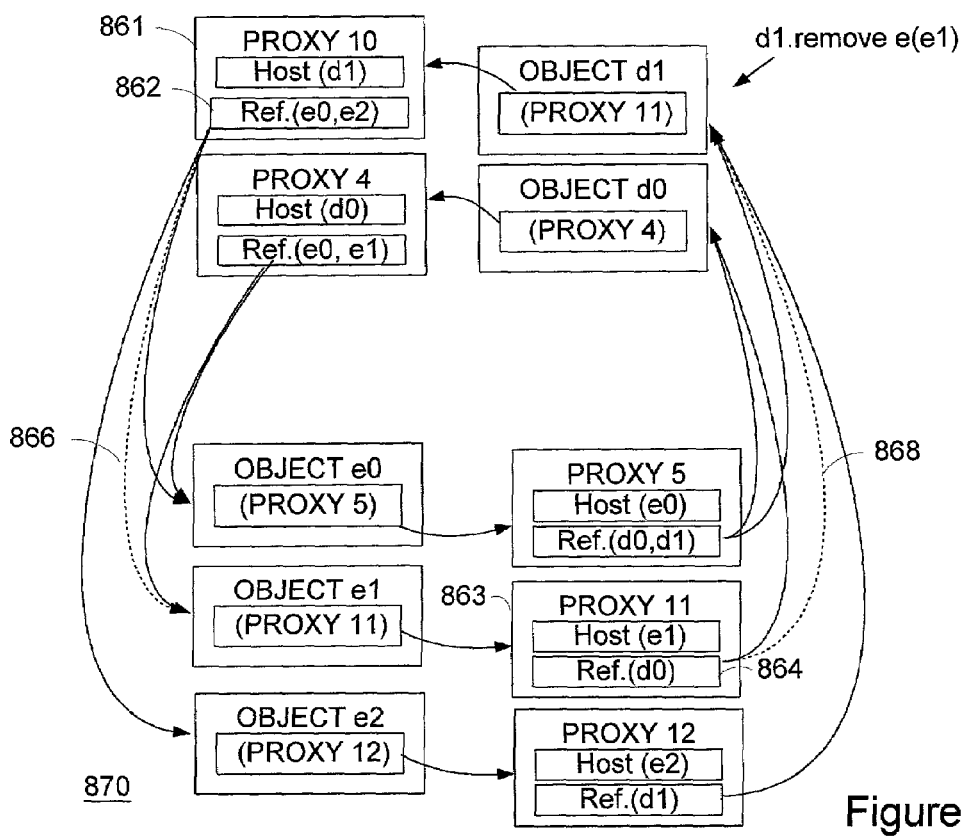

FIG. 13 illustrates the reference value setting for removal of a reference value from a many-to-many bi-directional relationship. In the original state 860, objects d0 and d1 are related with objects e0, e1 and e2 through a many-to-many bi-directional relationship. The reference attribute 862 of proxy object 861 for object d1 contains a collection of reference values e0, e1 and e2. The reference attribute 864 of proxy object 863 for object e1 contains a collection of reference values d0 and d1. As shown in the setting state 870, the user attempts to remove a reference value e1 for object d1, i.e., invokes a remove call:

d1.removeE(e1)

The proxy object 861 of the object d1 receives the reference value e1 to be removed, which changes the reference value 862 of proxy object 861 from a collection of e0, e1 and e2 to a new collection of e0 and e2. This results in removal of the peer relationship 866 from proxy object 861 to object e1. As the proxy object 861 has knowledge that objects d0 and d1 and objects e0, e1 and e2 have a many-to-many bi-directional relationship, the proxy object 861 determines a new peer value to be d0, i.e., removing d1, from the collection of reference values 864 in the proxy object 863 of object e1. This results in removing the peer relationship 868 from proxy object 422 to object d1. The determination and setting of the new values may be carried out automatically by the following process:

d1.proxy10.e1.proxy11.removeValue(d1);
d1.proxy10.removeValue(e1);

Thus, the one-to-many bi-directional relationship is updated through the removal of the pair of uni-directional peer relationships 866 and 868.

The above embodiments are described using Java technology as an example of an object based technology and language. However, the applicability of the invention is not limited to Java or Java based technologies. The invention may be applied to other object-based languages and technologies, such as those developed by Microsoft Corporation or Hewlett Packard, with or without appropriate modification as necessary or desired, and such application is within the scope of the invention.

The bi-directional relationship manager of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the elements of the bi-directional relationship manager are described individually, however, two or more elements may be provided as a single element, or one or more elements may be shared with other component in other computer systems.

What is claimed is:

1. A method for setting a new reference value for managing bi-directional relationships between objects in an object model of a relational database, the method comprising the steps of:
   receiving bi-directional relationship information indicating interrelation between objects having one or more bi-directional relationships,
   creating proxy objects based on the bi-directional relationship information for selected peer objects having bi-directional relationships, wherein the proxy objects have knowledge regarding a host object to which the proxy objects belong and one or more peer objects with which the host relates through a bi-directional relationship, and wherein the host object is included as a first peer object of the selected peer objects;
   receiving a first new peer value relating to a bi-directional relationship to be set in the host object,
   determining, using one or more of the proxy objects, a second new peer value to be set for a second peer object which has the bi-directional relationship with the host object;
   setting the first new peer value into the one or more proxy objects; and
   setting the second new peer value in a proxy object created for the second peer object so that the second peer object has a bi-directional relationship with the host object without a developer of the object model having to ensure all associated references are maintained;
   wherein the bi-directional relationship is managed so that pairs of corresponding bi-directional pointers get updated together.

2. The method as claimed in claim 1, wherein the bi-directional relationship information receiving step comprises the steps of:
   receiving object model meta-data defining relationships between objects in the object model; and
   retrieving reference value information that represents reference values indicating current peer objects for the bi-directional relationships.

3. The method as claimed in claim 1, wherein the bi-directional relationship information receiving step receives the reference value information from a data storage in which data corresponding to the objects is stored.

4. The method as claimed in claim 1, wherein the bi-directional relationship information receiving step receives the reference value information from a new object that is newly created by a user.

5. The method as claimed in claim 1, wherein the bi-directional relationship information receiving step receives the reference value information that includes a collection of reference values for a bi-directional relationship object which references many peer objects.

6. The method as claimed in claim 1, wherein the proxy object creating step creates proxy objects of uni-directional peer relationships that combined comprise bi-directional relationships.

7. The method as claimed in claim 6, wherein the proxy object creating step creates a proxy object for each of a pair of one-to-one uni-directional peer relationships that form a one-to-one bi-directional relationship.

8. The method as claimed in claim 6, wherein the proxy object creating step creates a proxy object for each of a one-to-many uni-directional peer relationship and one-to-one uni-directional peer relationships that form a one-to-many bi-directional relationship.

9. The method as claimed in claim 6, wherein the proxy object creating step creates a proxy object for each of uni-directional one-to-many peer relationships that form a many-to-many bi-directional relationship.

10. The method as claimed in claim 1, wherein the new peer value determining step comprises a step of passing the new reference value through related proxy objects that are related to the bi-directional relationship.

11. The method as claimed in claim 1, wherein the new peer value contains a collection of reference values which is determined based on the new reference value.

12. The method as claimed in claim 1, wherein the new reference value represents addition, removal or change of a reference value.

13. The method as claimed in claim 1, wherein the setting step sets a value null when the determining step determines to remove the bi-directional relationship.

14. The method as claimed in claim 1, wherein the setting step sets a new peer value by replacing an old reference value with the new peer value.

15. The method as claimed in claim 1, further comprising steps of:
   determining, using one or more of the proxy objects, another new peer value to be set in a new peer object which is referenced by the new reference value set for the selected object; and
   setting another new peer value to a proxy object created for the new peer object.

16. The method as claimed in claim 1, further comprising steps of:
   determining, using one or more of the proxy objects, an updating reference value for a related object that is related to the selected object through one or more original or new bi-directional relationships; and
   setting the updating reference value in a proxy object created for the related object.

17. The method as claimed in claim 16, wherein the updating reference value determining step and the updating reference value setting step are repeated for all related objects so as to maintain bi-directional relationship integrity.

18. The method as claimed in claim 16, wherein the updating reference value determining step comprises a step of passing the new reference value through related proxy objects that are created for the related objects.

* * * * *